(12) United States Patent
Kim

(10) Patent No.: US 11,487,975 B2
(45) Date of Patent: Nov. 1, 2022

(54) ELECTRONIC APPARATUS AND METHOD OF CONTROLLING THE SAME

(71) Applicant: Samsung Electronics Co., Ltd., Suwon-si (KR)

(72) Inventor: Sanghee Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 16/909,511

(22) Filed: Jun. 23, 2020

(65) Prior Publication Data
US 2020/0401856 A1 Dec. 24, 2020

(30) Foreign Application Priority Data

Jun. 24, 2019 (KR) .................. 10-2019-0074719

(51) Int. Cl.
*G06K 9/62* (2022.01)
*G06N 3/04* (2006.01)
(Continued)

(52) U.S. Cl.
CPC ......... *G06K 9/6279* (2013.01); *G06K 9/6217* (2013.01); *G06N 3/04* (2013.01); *G06N 3/08* (2013.01); *G06V 10/454* (2022.01)

(58) Field of Classification Search
CPC ...... G06N 3/0445; G06N 3/0454; G06N 3/08; G06T 2207/20084; G06T 2207/20081;
(Continued)

(56) References Cited

U.S. PATENT DOCUMENTS

2018/0189615 A1   7/2018 Kang et al.
2018/0285679 A1* 10/2018 Amitay ................ G06T 11/001
(Continued)

FOREIGN PATENT DOCUMENTS

EP   1 318 475 A1    6/2003
EP    1318475 A1 *   6/2003  ............. A47H 13/00
(Continued)

OTHER PUBLICATIONS

Caesar et al., "COCO-Stuff: Thing and Stuff Classes in Context", *Computer Vision Foundation*, Jun. 2018, p. 1209-1218.
(Continued)

*Primary Examiner* — Ross Varndell
(74) *Attorney, Agent, or Firm* — Staas & Halsey LLP

(57) ABSTRACT

Disclosed is an electronic apparatus comprising, a memory configured to store instructions; and at least one processor connected to the memory, and configured to detect at least one object of a first-class object or a second-class object included in a target image by the electronic apparatus using an artificial intelligent algorithm to apply the target image to a learned neural network model, and identify and apply an image-quality processing method to be individually applied to at least one detected object, the neural network model is set to detect an object included in an image, as trained based on learning data such as an image, a class to which the image belongs, information about the first-class object included in the image, and information about the second-class object included in the image.

17 Claims, 12 Drawing Sheets

(51) Int. Cl.
*G06N 3/08* (2006.01)
*G06V 10/44* (2022.01)

(58) Field of Classification Search
CPC ........ G06T 7/11; G06V 10/82; G06K 9/6267; G06K 9/628
See application file for complete search history.

(56) References Cited

U.S. PATENT DOCUMENTS

| | | | |
|---|---|---|---|
| 2019/0043203 A1 | 2/2019 | Fleishman et al. | |
| 2019/0057507 A1 | 2/2019 | El-Khamy et al. | |
| 2019/0279345 A1 | 9/2019 | Kim et al. | |
| 2020/0234044 A1 | 7/2020 | Cai et al. | |
| 2021/0406615 A1* | 12/2021 | Rao | G06K 9/6268 |

FOREIGN PATENT DOCUMENTS

| | | |
|---|---|---|
| EP | 3 531 370 A2 | 8/2019 |
| EP | 3 674 967 A1 | 7/2020 |
| KR | 10-2018-0051367 A | 5/2018 |
| WO | WO 2019/072057 A1 | 4/2019 |
| WO | WO-2020240809 A1 * 12/2020 ........... G06K 9/2054 |

OTHER PUBLICATIONS

Shu Liu et al., "Path Aggregation Network for Instance Segmentation", Arxiv.org, Cornell University Library, 201 Olin Library Cornell University Ithaca, NY 14853, Mar. 5, 2018 (Mar. 5, 2018), XP081555910**.
Extended European Search Report dated Nov. 10, 2020, in corresponding European Patent Application No. 20181762.4.
Office Action dated Apr. 25, 2022, in European Application No. 20 181 762.4.

* cited by examiner

ELECTRONIC APPARATUS AND METHOD OF CONTROLLING THE SAME

CROSS-REFERENCE TO RELATED THE APPLICATION

This application is based on and claims priority under 35 U.S.C. § 119 to Korean Patent Application No. 10-2019-0074719 filed on Jun. 24, 2019 in the Korean Intellectual Property Office, the disclosure of which is incorporated by reference herein in its entirety.

BACKGROUND

Field

The disclosure relates to an electronic apparatus and a method of controlling the same, and more particularly to an electronic apparatus and a method of learning a learning model to detect objects included in an image and different in features and detecting the object of the image based on the learning model.

Description of the Related Art

To enhance image or video quality, an electronic apparatus has applied various image-quality enhancing algorithms to an image or video. For example, the electronic apparatus may apply one image-quality enhancing algorithm based on general features of an image. Alternatively, the electronic apparatus may identify objects included in an image and different image-quality enhancing algorithms to the respective objects.

When the electronic apparatus applies one image-quality enhancing algorithm to an image, some objects included in the image may be changed in color or texture.

Although the electronic apparatus identifies individual objects and then respectively applies image-quality enhancing algorithms to the individual objects, a plurality of parts included in each object are not taken into account, and therefore the individual features of the plurality of parts or the individual features of the objects of the same kind may not be reflected.

SUMMARY

According to an exemplary embodiment, there is provided an electronic apparatus comprising, a memory configured to store instructions; and at least one processor connected to the memory, and configured to detect at least one object of a first-class object or a second-class object included in a target image by the electronic apparatus using an artificial intelligent algorithm to apply the target image to a learned neural network model, and identify and apply an image-quality processing method to be individually applied to at least one detected object, the neural network model is set to detect an object included in an image, as trained based on learning data such as an image, a class to which the image belongs, information about the first-class object included in the image, and information about the second-class object included in the image.

The information about the first-class object comprises at least one of information about pixels corresponding to an object, information about a bounding box surrounding the object, and information about a texture of the object, and the information about the second-class object comprises at least one of information about pixels corresponding to an object, and information about a texture of the object.

The neural network model comprises a feature-extraction neural network to estimate a class to which an image belongs, a first-class object detection neural network to detect the first-class object, and a second-class object detection neural network to detect the second-class object.

The feature-extraction neural network comprises a plurality of layers comprising a plurality of filters.

The plurality of layers comprises: a layer comprising a plurality of layers to obtain at least one of texture information, color information or edge information of the target image; and a layer comprising a plurality of layers to obtain at least one of color information or edge information about a shape of at least a partial area of an object included in the target image.

The processor is configured to extract features of the target image through at least some filters among the plurality of filters, and decrease result values through at least some other filters.

The processor is configured to detect the first-class object included in the target image by applying the features of the target image obtained through the feature-extraction neural network to the first-class object detection neural network.

The processor is configured to control the first-class object detection neural network to merge a result of detecting the first-class object based on at least one of the texture information, the color information, or the edge information of the target image, and a result of detecting the first-class object based on at least one of the color information or the edge information about a shape of at least some areas of an object included in the target image, and identify the first-class object having a high confidence level.

The processor is configured to control the second-class object detection neural network to detect the second-class object by increasing result values, which are obtained from applying the plurality of filters to the features of the target image obtained in each layer of the feature-extraction neural network, into a preset size and then merging the result values.

The processor is configured to identify and apply the image-quality processing method corresponding to the detected first-class object or the second-class object.

According to another exemplary embodiment, there is provided a method of controlling an electronic apparatus, comprising: detecting at least one object of a first-class object or a second-class object included in a target image by using an artificial intelligent algorithm to apply the target image to a learned neural network model; identifying an image-quality processing method to be individually applied to the at least one detected object; and applying the detected image-quality processing method.

The neural network model comprises a feature-extraction neural network configured to estimate a class to which an image belongs, a first-class object detection neural network to detect the first-class object, and a second-class object detection neural network to detect the second-class object.

The feature-extraction neural network comprises a plurality of layers comprising a plurality of filters.

The plurality of layers comprises: a layer comprising a plurality of layers to obtain at least one of texture information, color information or edge information of the target image; and a layer comprising a plurality of layers to obtain at least one of color information or edge information about a shape of at least a partial area of an object included in the target image.

Further comprising extracting features of the target image through at least some filters among the plurality of filters, and decreasing result values through at least some other filters.

Further comprising detecting the first-class object included in the target image by applying the features of the target image obtained through the feature-extraction neural network to the first-class object detection neural network.

Further comprising controlling the first-class object detection neural network to merge a result of detecting the first-class object based on at least one of the texture information, the color information, or the edge information of the target image, and a result of detecting the first-class object based on at least one of the color information or the edge information about a shape of at least some areas of an object included in the target image, and identifying the first-class object having a high confidence level.

Further comprising controlling the second-class object detection neural network to detect the second-class object by increasing result values, which are obtained from applying the plurality of filters to the features of the target image obtained in each layer of the feature-extraction neural network, into a preset size and then merging the result values.

Further comprising identifying and applying the image-quality processing method corresponding to the detected first-class object or the second-class object.

According to another exemplary embodiment, there is provided a computer-readable recording medium recorded with instructions for: detecting at least one object of a first-class object or a second-class object included in a target image by using an artificial intelligent algorithm to apply the target image to a learned neural network model; identifying an image-quality processing method to be individually applied to the at least one detected object; and applying the detected image-quality processing method.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

An electronic apparatus according to various embodiments described in the disclosure may include various types of apparatuses. The electronic apparatus may for example include a portable communication apparatus (e.g. a smartphone), a computer system, a portable multimedia apparatus, a portable medical apparatus, a camera, a wearable apparatus, or a home appliance. The electronic apparatus according to an embodiment of the disclosure is not limited to the foregoing examples.

Various embodiments of the disclosure and terms used herein are not construed as limiting technical features described in the disclosure to specific embodiments, but including various alterations, equivalents or alternatives of the embodiments. Regarding the accompanying drawings, like numerals refer to like elements throughout. A singular form of a noun corresponding to an item may also include one item or a plurality of items unless the content clearly dictates otherwise. In the disclosure, terms "A or B", "at least one of A and B", "at least one of A or B", "A, B or C", "at least one of A, B and C", "at least one of A, B or C", and the like may include one among the elements enumerated together or all possible combinations thereof. In the disclosure, terms "a first", "a second", "the first", "the second", or etc. may be just used to distinguish an element from another without limiting the element to a certain criterion (e.g. importance or order). When it is mentioned that a certain element (e.g. a first element) is "coupled" or "connected" to a different element (e.g. a second element) with terms "operatively" or "communicatively" or without such terms, it means that the certain element can be connected to the different element directly (e.g. by a wire), wirelessly or via another element (e.g. a third element).

In the disclosure, a term "module" may include a unit achieved by hardware, software or firmware, and may for example be used compatibly with logic, a logic block, a part, a circuit or the like term. The module may denote an integrated part, or the minimum unit or section of the part that performs one or more functions. For example, according to an embodiment, the module may be achieved in the form of application-specific integrated circuit (ASIC).

Figure 1:
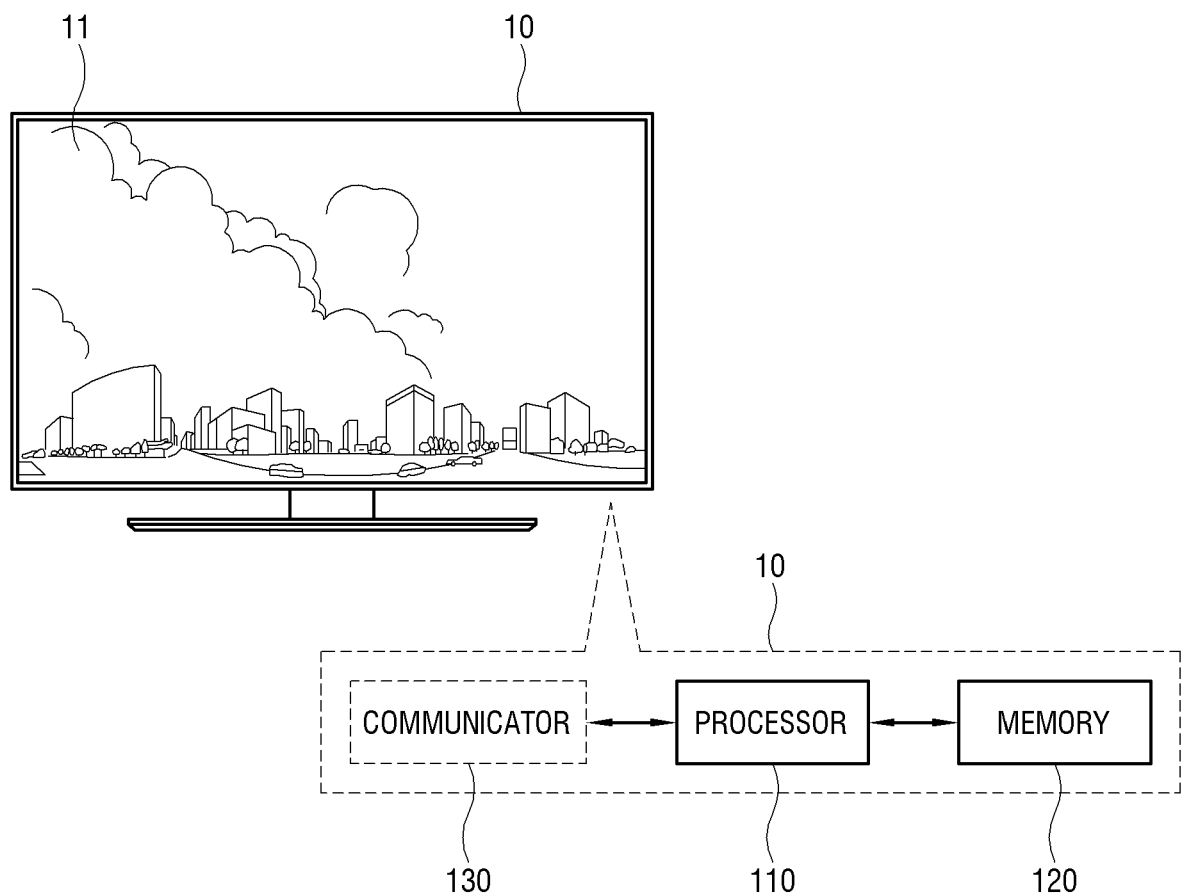
FIG. 1 shows an outer appearance and a schematic block diagram of an electronic apparatus according to an embodiment.

FIG. 1 shows an outer appearance and a schematic block diagram of an electronic apparatus according to an embodiment;

According to an embodiment, an electronic apparatus 10 may be a television (TV), but the TV is merely an example. The electronic apparatus 10 may be embodied in various forms including a display 11. For example, the electronic apparatus 10 may be embodied by various electronic apparatuses such as a mobile phone, a tablet personal computer (PC), a digital camera, a camcorder, a laptop computer, a desktop computer, an electronic-book terminal, a digital broadcasting terminal, personal digital assistants (PDA), a portable multimedia player (PMP), a navigation system, an MP3 player, a server, a wearable device, and the like. In particular, embodiments may be implemented in a display apparatus with a large format display like a TV, but not limited to such a display apparatus.

Further, the electronic apparatus 10 may be stationary or mobile, and may be a digital broadcast receiver capable of receiving digital broadcasting. Further, the electronic apparatus 10 may include a curved display or a flexible display as well as a flat display. The output resolution of the electronic apparatus 10 may for example include high definition (HD), full HD, ultra HD, or resolutions higher than the ultra HD.

The electronic apparatus 10 may include a processor 110 and a communicator 130, and communicate with another external apparatus. The communicator 130 may include a wireless communication module (e.g. a cellular communication module, and near-field wireless communication modules such as a Bluetooth low energy (BLE) communication module and a Wi-Fi communication module) and a wired communication module (e.g. a local area network (LAN) communication module, and a power line communication module).

According to an embodiment, the electronic apparatus 10 may include the processor 110 and a memory 120. However, there are no limits to the elements of the electronic apparatus 10. The electronic apparatus 10 may additionally include at least one element, or may exclude some elements. For example, the electronic apparatus 10 may further include the display 11 to display an image. Alternatively, the electronic apparatus 10 may further include the communicator 130 to exchange data with an external apparatus (e.g. a server).

The memory 120 may for example include an internal memory or an external memory. The internal memory may for example include at least one of a volatile memory (e.g. a dynamic random access memory (DRAM), a static RAM (SRAM), a synchronous dynamic RAM (SDRAM), etc.); a nonvolatile memory (e.g. a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g. a NAND flash, a NOR flash, etc.)); a hard disk drive; or a solid state drive (SSD).

The external memory may include a flash drive, for example, a compact flash (CF) memory, secure digital (SD), a micro secure digital (Micro-SD) memory, a mini secure digital (Mini-SD) memory, an extreme digital (xD) memory, a multi-media card (MMC) or a memory stick. The external memory may be functionally and/or physically connected to the electronic apparatus 10 through various interfaces.

According to an embodiment, the memory 120 may be configured to store at least one neural network model. The memory 120 may be configured to store learning data to learn a neural network model. The learning data may for example include an image, information about the image, and information about objects included in the image.

According to an embodiment, the memory 120 may be configured to at least one instruction set for instructing the electronic apparatus 10 to apply a target image to a learned neural network model based on an artificial intelligent algorithm and detect at least one object included in the target image.

The processor 110 is configured to control general operations of the electronic apparatus 10. For example, the processor 110 drives an operating system or an application program to control a plurality of hardware or software elements connected to the processor 110, and perform various data processes and operations. The processor 110 may include one or both of a central processing unit (CPU) or a graphics-processing unit (GPU). The processor 110 may be embodied by at least one general processor, a digital signal processor, an application specific integrated circuit (ASIC), a system on chip (SoC), a microcomputer (MICOM), etc. The processor 110 may execute computer executable instructions stored in the memory 120, thereby carrying out operations of the electronic apparatus 10 according to various embodiments of the disclosure.

According to an embodiment, the processor 110 may train the neural network model based on learning data stored in the memory 120.

According to an embodiment, the processor 110 may detect at least one object included in the target image by applying the target image to the learned neural network model based on the artificial intelligent algorithm. The processor 110 may obtain an image processing method corresponding to the detected object and apply the obtained image processing method to the object. The processor 110 may control the display 11 to display an output image to which image processing is applied.

The communicator 130 of the electronic apparatus 10 is connected to a network through wireless communication or wired communication, and communicate with an external apparatus (e.g. the server). For example, the communicator 130 may communicate with the external apparatus through infrared data association (IrDA,), radio frequency identification (RFID), near field communication (NFC), Wi-Fi, ultra wideband (UWB), wireless display (WiDi), Wireless HD (WiHD), wireless home digital interface (WHDI), Miracast, wireless gigabit alliance (Wigig), Wi-Fi Direct, Bluetooth (e.g. Bluetooth Classic, BLE), AirPlay, Z-wave, 4LoWPAN, long-term evolution (LTE) D2D, GPRS, Weightless, Edge Zigbee, digital living network alliance (DLNA), ANT+, digital enhanced cordless telecommunications (DECT), wireless local area network (WLAN), global system for mobile communications (GSM), universal mobile telecommunication system (UMTS), LTE, wireless broadband (WiBRO), or the like communication method.

Figure 2:
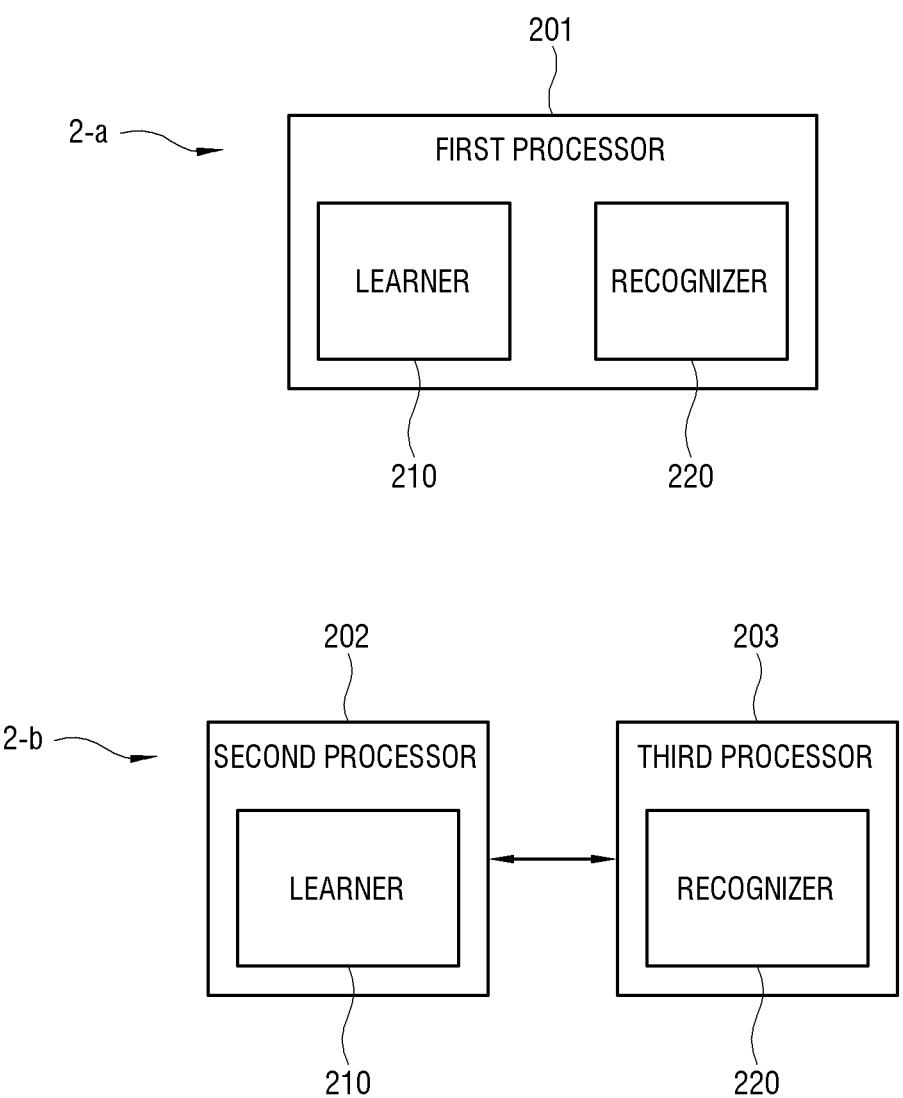
FIG. 2 shows processors for processing an artificial neural network according to an embodiment.

FIG. 2 shows processors for processing an artificial neural network according to an embodiment.

In FIG. 2, a first processor 201, a second processor 202, and a third processor 203 may be a general processor (e.g. a CPU or an application processor), a graphics-only processor (e.g. a GPU), or a processor integrated into an SoC chip (e.g. an on-device artificial intelligent chip (On-device AI Chip)). The processor 110 of FIG. 1 may be equivalent to at least one of the first processor 201, the second processor 202 or the third processor 203.

Referring to '2-a' in FIG. 2, the first processor 201 may implement functions of a learner 210 and a recognizer 220. The learner 210 may function to generate a learned neural network model, and the recognizer 220 may function to recognize (infer, predict, estimate, or identify) data based on the learned neural network model.

The learner 210 may generate or update the neural network model. To generate the neural network model, the learner 210 may obtain learning data. For example, the learner 210 may obtain the learning data from the memory 120 of the electronic apparatus 10 or from the external apparatus (e.g. the server). The learning data may refer to data used for learning of the neural network model.

Figure 3:
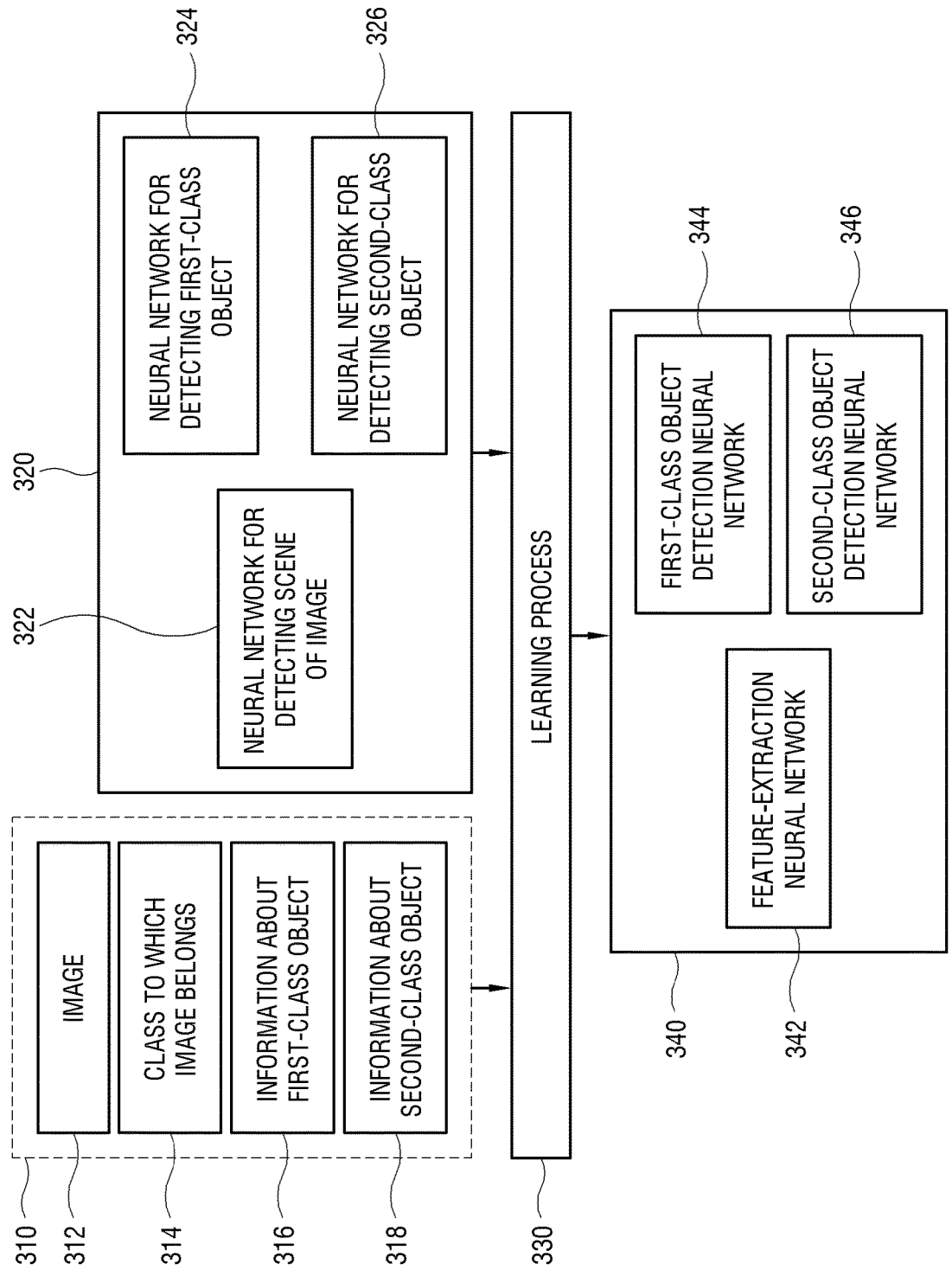
FIG. 3 shows that an electronic apparatus according to an embodiment employs a learner to train a neural network model.

FIG. 3 shows that an electronic apparatus according to an embodiment employs a learner to train a neural network model.

Referring to FIG. 3, an image 312, a class 314 to which the image 312 belongs, information 316 about a first-class object included in the image 312, and information 318 about a second-class object included in the image 312 may be used as learning data 310 by the learner 210.

According to an embodiment, the learner 210 may apply preprocessing to the obtained learning data 310 before training the neural network model based on the learning data 310, or may select a piece of data to be used in learning among a plurality of pieces of the learning data 310. For example, the learner 210 may process the learning data 310 into data suitable for learning by making the learning data 310 have a preset format, filtering the learning data 310, or adding/removing data to and from the learning data 310.

According to an embodiment, the learner 210 may generate the neural network model 340 targeted at detecting at least one object included in an image based on the preprocessed learning data 310. For example, the learner 210 may apply a target neural network model 320 forming a base for the learning and the learning data 310 to a learning process 330, thereby generating a neural network model set to detect at least one object included in an image. The learning process 330 may for example refer to an algorithm set to generate the neural network model 340 targeted as above by inputting the learning data 310 to the target neural network model 320.

According to an embodiment, the target neural network model 320 may include a plurality of neural networks. For example, the target neural network model 320 may include a neural network 322 for extracting features of an image, a neural network 324 for detecting a first-class object, and a neural network 326 for detecting a second-class object.

According to an embodiment, the neural network 322 for extracting features of an image may estimate a class (e.g. a scenery image, a people image, a night-view image, etc.) to which the image belongs based on the extracted features.

According to an embodiment, the neural network 324 for detecting the first-class object may estimate first-class objects which are individually countable like people, trees, vehicles, dogs, etc.

According to an embodiment, the neural network 326 for detecting the second-class object may estimate second-class objects which are individually uncountable and considered as a whole like the sky, the grass, water, a wood, etc.

According to an embodiment, the learning data 310 may include the image 312, the class 314 to which the image 312 belongs, the information 316 about the first-class objects included in the image 312 (e.g. pixels information corresponding objects, a bounding box (BBOX) including objects, and texture information about objects), and the information 318 about the second-class objects included in the image 312 (e.g. pixel information corresponding to objects, and texture information about objects). The electronic apparatus 10 may train the target neural network model 320 based on the learning data including various classes and various objects.

According to an embodiment, the learner 210 may train the target neural network model 320, which includes the neural network 322 for extracting features of an image, the neural network 324 for detecting the first-class objects and the neural network 326 for detecting the second-class objects, at once to thereby shorten learning time, save a space for storing the neural network model, and improving learning performance because the learning data having similar features is shared.

For example, the learner 210 may train the neural network 322 for extracting features of an image, based on the image 312 and the class 314 to which the image 312 belongs. The learner 210 inputs the features of the image extracted by the neural network 322 into the neural network 324 for detecting the first-class object and the neural network 326 for detecting the second-class object, thereby controlling the neural network 324 for detecting the first-class object and the neural network 326 for detecting the second-class object to distinguish between the objects together with different learning data 310 and learn necessary information. The learner 210 repetitively trains the target neural network model 320 until result values converge to a constant value.

According to an embodiment, the learner 210 may generate the neural network model 340, which is set to be targeted at detecting at least one object included in the image, by training the target neural network model 320 based on unsupervised learning, supervised learning or reinforcement learning.

The learned neural network model 340 may include a plurality of neural networks (or layers). The nodes of the plurality of neural networks have weighted values, and the plurality of neural networks may be connected to one another so that an output value of a certain neural network can be used as an input value for another neural network.

For example, the learned neural network model 340 may include a feature-extraction neural network 342 that extracts features of an image and estimates a class to which the image belongs. Further, the learned neural network model 340 may include a first-class object detection neural network 344 that detects the first-class objects and estimates pixel information corresponding to the detected first-class objects, the BBOX indicating a quadrangular area including the detected objects, and texture information about the detected objects. Further, the learned neural network model 340 may include a second-class object detection neural network 346 that detects the second-class objects and estimates pixel information corresponding to the detected second-class objects, and texture information about the detected objects.

As examples of the neural network model, there are a convolutional neural network (CNN), a deep neural network (DNN), a recurrent neural network (RNN), a restricted Boltzmann machine (RBM), a deep belief network (DBN), a bidirectional recurrent neural network (BRNN), a deep q-network) and the like model, but there are no limits to these examples.

Referring to FIG. 2, the recognizer 220 may obtain the target data for recognition targeted at detecting at least one object included in an image. For example, the recognizer 220 may obtain target data from the memory 120 of the electronic apparatus 10, and from the external apparatus (e.g. the server).

The target data may for example be data targeted at being recognized by the neural network model, and may include an image or a video.

According to an embodiment, the recognizer 220 may perform preprocessing with respect to the obtained target data before applying the target data to the learned neural network model, or may select a piece of data to be used in recognition among a plurality of pieces of data. For example, the recognizer 220 process the target data into data suitable for recognition by making the target data have a preset format, filtering the target data, or adding/removing noise to/from the target data.

Figure 4:
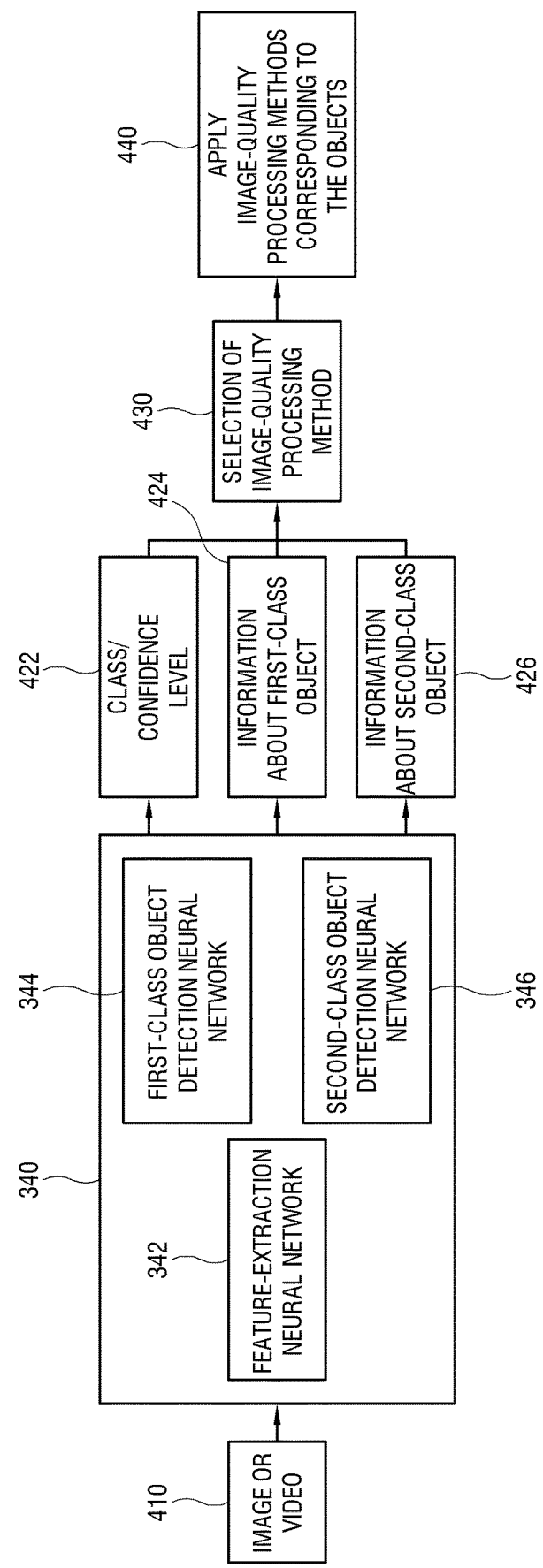
FIG. 4 shows that an electronic apparatus according to an embodiment detects an object from a target image based on a learned neural network model.

FIG. 4 shows that an electronic apparatus according to an embodiment detects an object from a target image based on a learned neural network model.

Referring to FIG. 4, the recognizer 220 applies the preprocessed target data to the neural network model 340 set to be targeted at detecting at least one object included in an image, thereby obtaining an output value output from the neural network model 340.

For example, the recognizer 220 may apply an image 410 (or a video) to the neural network model 340 set to be targeted at detecting at least one object included in the image. The plurality of neural networks 342, 344 or 346 included in the neural network model 340 may generate output values, respectively. Each output value may further include a probability value (or a confidence value). It will be described with reference to FIGS. 5 to 6 that each neural network 342, 344 or 346 generates the output value.

Figure 5:
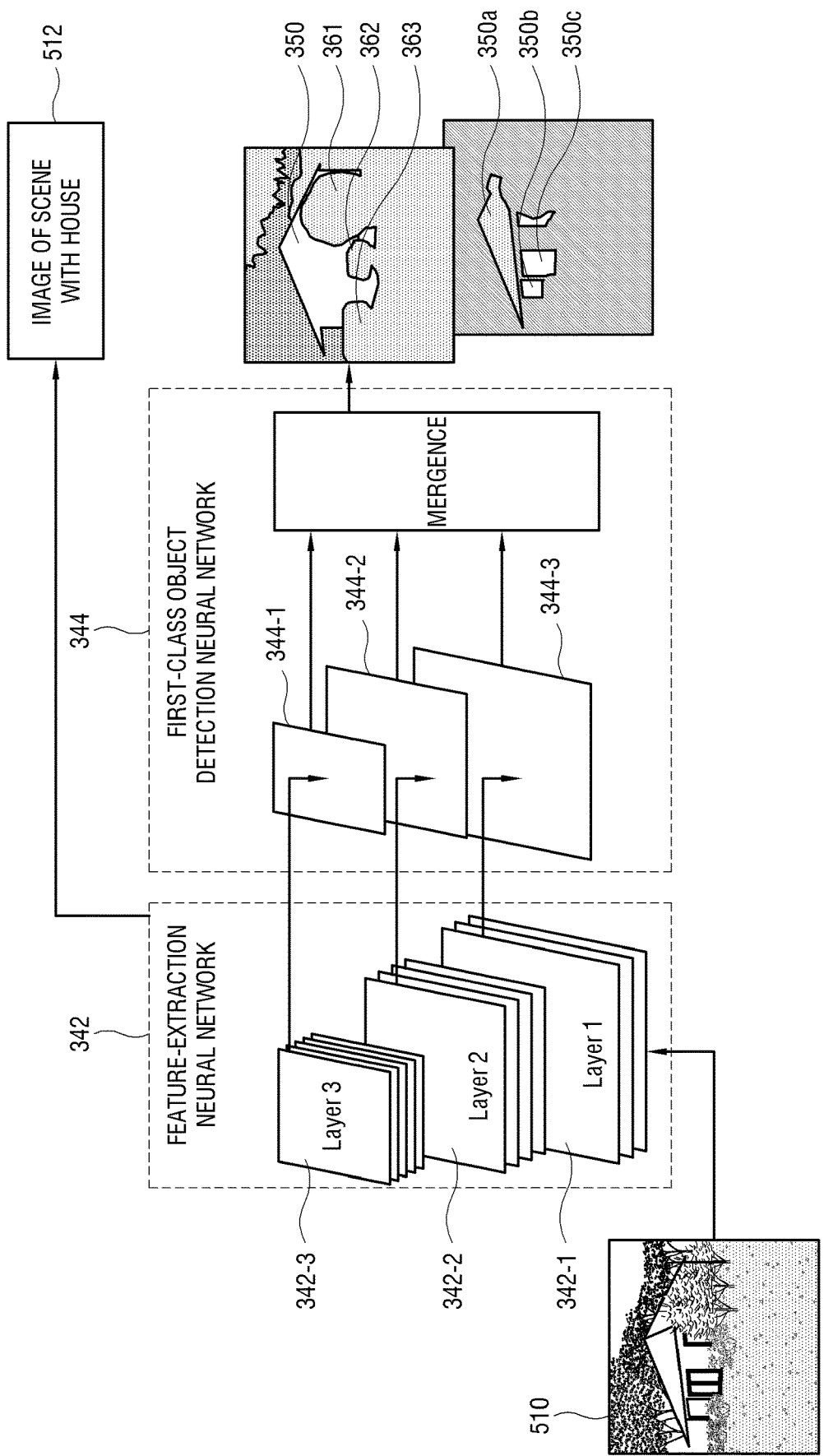
FIG. 5 shows that an electronic apparatus according to an embodiment detects a first-class object based on a learned neural network model.

FIG. 5 shows that an electronic apparatus according to an embodiment detects a first-class object based on a learned neural network model.

According to an embodiment, when an image (or a video) 510 is input as target data to the neural network model 340, the recognizer 220 may estimate and detect at least one first-class object included in the image 510 based on the neural network model 340.

Referring to FIG. 5, the recognizer 220 may apply the image 510 to the feature-extraction neural network 342. The feature-extraction neural network 342 may for example include a plurality of layers 342-1, 342-2 or 342-3. Each of the layers 342-1, 342-2 or 342-3 may include a group of a plurality of filters. The filters may for example refer to functions for detecting whether features are present in data. For example, when the electronic apparatus 10 applies an edge detecting filter to the image, a large value may be obtained with respect to a pixel corresponding to an edge among pixels of the image, and a value converging to 0 may be obtained with respect to a pixel corresponding to no edges.

According to an embodiment, the electronic apparatus 10 may obtain weighted values for the filters based on a learning process. According to an embodiment, each of the layers 342-1, 342-2, or 342-3 may be different in the number of filters included therein.

According to an embodiment, the layers that constitute the feature-extraction neural network 342 may be decreased in size in order of a first layer 342-1, a second layer 342-2, and a third layer 342-3. For example, the electronic apparatus 10 may reduce the sizes of layers in sequence by applying a filter for decreasing a result value obtained by the filter for extracting the features. In this case, the electronic apparatus 10 may employ a pooling method.

According to an embodiment, the feature-extraction neural network 342 may obtain at least one of the edge information of the image 510, the texture information of the image 510, or the color information of the image 510 as results by applying the image 510 to the first layer 342-1. The feature-extraction neural network 342 applies a result value obtained using the first layer 342-1 to the second layer 342-2, and applies a result value obtained using the second layer 342-2 to the third layer 342-3, thereby obtaining results of at least one of the edge information or the color information about a shape forming at least a part of various objects (e.g. a house, a window, a tree, a door, a mountain, the sky, etc.) included in the image 510.

According to an embodiment, the feature-extraction neural network 342 may estimate a class to which the image 510 belongs, based on the obtained results. For example, the feature-extraction neural network 342 may estimate that the image 510 belongs to an image class 512 of a scene with a house.

According to an embodiment, the feature-extraction neural network 342 may estimate a plurality of image classes.

In this case, the recognizer 220 may select a result having the highest confidence level. According to an embodiment, pieces of information obtained by the feature-extraction neural network 342 may be used in the first-class object detection neural network 344 and the second-class object detection neural network 346. For example, the first-class object detection neural network 344 and the second-class object detection neural network 346 may employ information about a class to which an image belongs, which is obtained by the feature-extraction neural network 342, in detecting an object. Further, the first-class object detection neural network 344 and the second-class object detection neural network 346 may use results obtained by the feature-extraction neural network 342 to detect various objects included in the image 510.

Referring to FIG. 5, the first-class object detection neural network 344 may estimate the first-class objects with respect to the results obtained in the layers 342-1, 342-2 or 342-3 of the feature-extraction neural network 342.

According to an embodiment, the first-class object detection neural network 344 may increase the probability of estimating the first-class objects having various sizes based on the results having different sizes, which are obtained by the layers 342-1, 342-2 or 342-3 having different sizes of the feature-extraction neural network 342.

In other words, the first-class object detection neural network 344 adds up from the first-class object estimated by a small layer (e.g. the third layer 342-3) to the first-class object estimated by a large layer (e.g. the first layer 342-1), preferentially selects a BBOX including the objects having high confidence levels among the plurality of estimated first-class objects, and detects the first-class object within the BBOX.

According to an embodiment, when the detected first-class object includes a plurality of parts and the plurality of parts are overlapped, the first-class object detection neural network 344 may identify a BBOX corresponding to a plurality of parts, which constitute the detected first-class object, besides the BBOX including the whole detected first-class object.

For example, referring to FIG. 5, the first-class object detection neural network 344 may detect a house 350, a first tree 361, a second tree 362, and a third tree 363 as the first-class object. Further, the first-class object detection neural network 344 may detect a roof 350a, a first window 350b, and a second window 350c as parts that constitute the house 350.

Thus, the first-class object detection neural network 344 may estimate the BBOX, the pixel information corresponding to the first-class object, and the texture information, with respect to results having different sizes obtained in the layers 342-1, 342-2 or 342-3 having different sizes of the feature-extraction neural network 342. Further, the first-class object detection neural network 344 may detect the first-class objects having high confidence levels based on mergence of the estimated results. In this case, the first-class object detection neural network 344 may give numbers to the same kinds of first-class objects.

Figure 6:
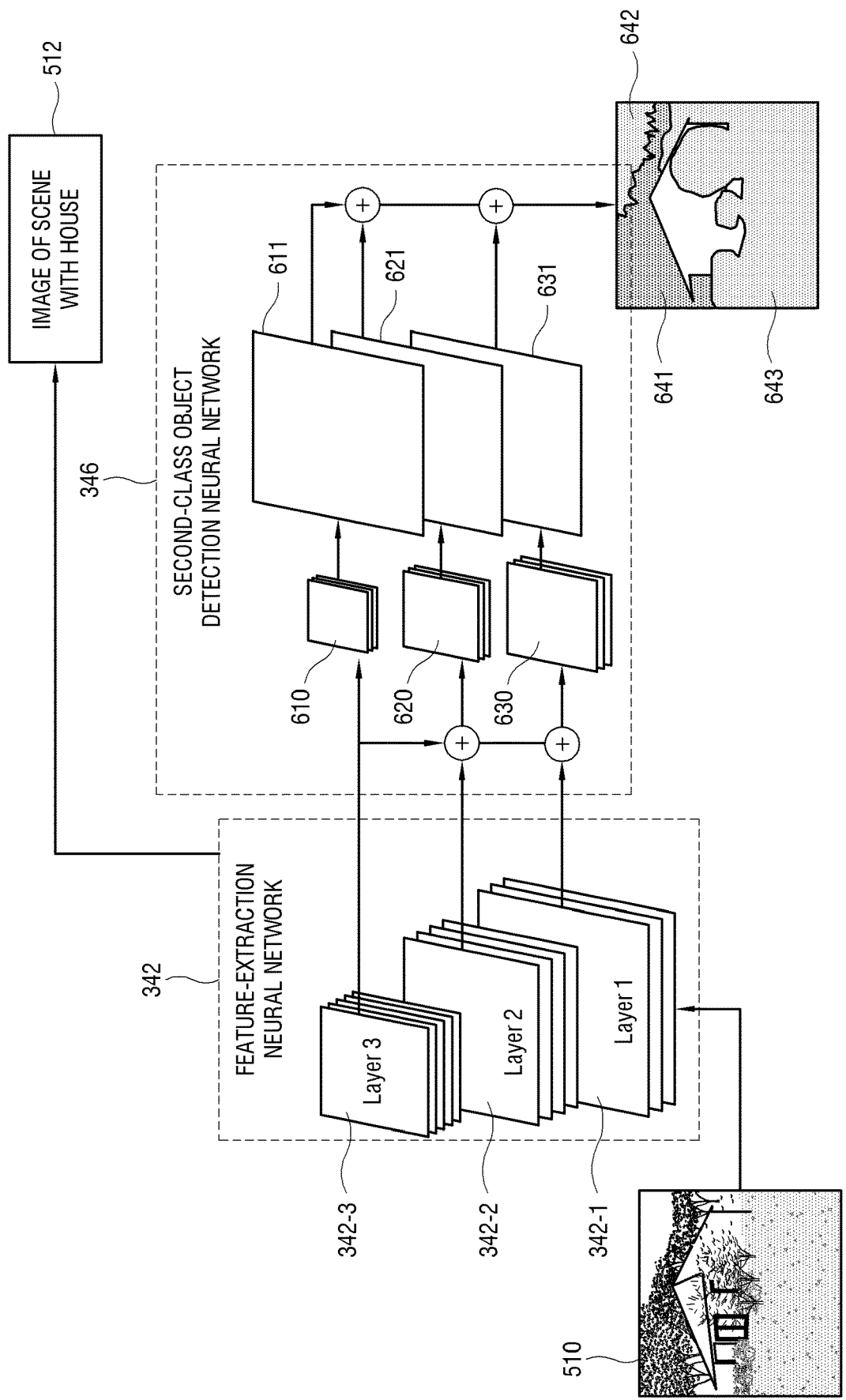
FIG. 6 shows that an electronic apparatus according to an embodiment detects a second-class object based on a learned neural network model.

FIG. 6 shows that an electronic apparatus according to an embodiment detects a second-class object based on a learned neural network model.

According to an embodiment, when the image 510 is input as the target data, the recognizer 220 may estimate and detect at least one second-class object included in the image 510 based on the neural network model 340.

Referring to FIG. 6, the recognizer 220 may apply the image 510 to the feature-extraction neural network 342.

Processes performed in the feature-extraction neural network 342 are equivalent to those described above with reference to FIG. 5, and thus repetitive descriptions thereof will be avoided.

According to an embodiment, the second-class object detection neural network 346 may use results having different sizes, obtained in the layers 342-1, 342-2, or 342-3 having different sizes of the feature-extraction neural network 342.

For example, the second-class object detection neural network 346 may extract features of a certain area included in the shape of the second-class object by applying at least one filter to the results obtained in the third layer 342-3, and repeats a job of increasing the size of results to reach a preset size. Further, the second-class object detection neural network 346 may add up results obtained in the second layer 342-2 and results obtained in the third layer 342-3, extract features of a certain area included in the shape of the second-class object by applying at least one filter to the merged results, and repeat the job of increasing the size of results to have a preset size.

Further, the second-class object detection neural network 346 may add up results obtained in the first layer 342-1, results obtained in the second layer 342-2, and results obtained in the third layer 342-3, extract features of a certain area included in the shape of the second-class object by applying at least one filter to the merged results, and repeat the job of increasing the size of results to have a preset size.

In this case, the sizes up to which the sizes of results are increased by the second-class object detection neural network 346 may be all the same. Further, the preset size may for example be suitable for estimating the second-class object based on the extracted features. For example, the preset size may be the same as the size of original image 510.

According to an embodiment, the second-class object detection neural network 346 may add up all the results, the sizes of which are changed into the preset size, and then estimate and detect the second-class object.

According to an embodiment, when the first-class object obtained using the first-class object detection neural network 344 and the second-class object obtained using the second-class object detection neural network 346 are present, the recognizer 220 may detect both of them as results.

Further, when the first-class object obtained using the first-class object detection neural network 344 and the second-class object obtained using the second-class object detection neural network 346 are overlapped, the recognizer 220 may give priority to the first-class object obtained using the first-class object detection neural network 344.

Referring to FIG. 4, the electronic apparatus 10 may obtain at least one of a class and/or confidence level 422 to which an image belongs to, information 424 about the first-class object, and information 426 about the second-class object from the neural network model 340.

According to an embodiment, the electronic apparatus 10 may identify image-quality processing method corresponding to the obtained objects (430). For example, when the detected object is a face, the electronic apparatus 10 may identify an image-quality processing method of brightening up a skin tone of the face. Alternatively, when the detected object is a tree, the electronic apparatus 10 may identify an image-quality processing method of highlighting a specific color or an edge area to render the texture of the tree.

According to an embodiment, the electronic apparatus 10 may apply image-quality processing methods corresponding to the objects to the image 410 (440).

Like this, the electronic apparatus 10 according to an embodiment of the disclosure may use a plurality of neural networks included in the neural network model 340 to detect objects included in an image or video to be individually subjected to image-quality processing methods. Thus, it is possible to decrease a phenomenon that some objects included in the image are changed in color or lose their edge details after undergoing image processing FIG. 7 shows that an electronic apparatus according to an embodiment performs image processing with regard to a target image based on a neural network model, FIG. 8 shows that a neural network model according to an embodiment detects objects included in a target image, and FIG. 9 shows that an electronic apparatus according to an embodiment displays a target image by performing image processing.

Figure 7:
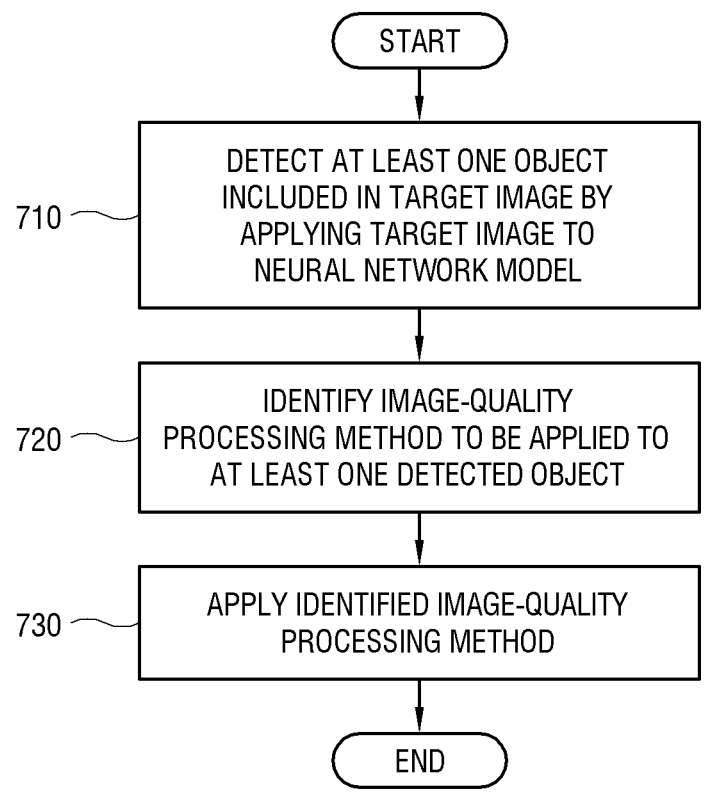
FIG. 7 shows that an electronic apparatus according to an embodiment performs image processing with regard to a target image based on a neural network model.

Referring to operation 710 in FIG. 7, the electronic apparatus 10 may detect at least one object included in a target image by applying the target image to a neural network model.

Figure 8:
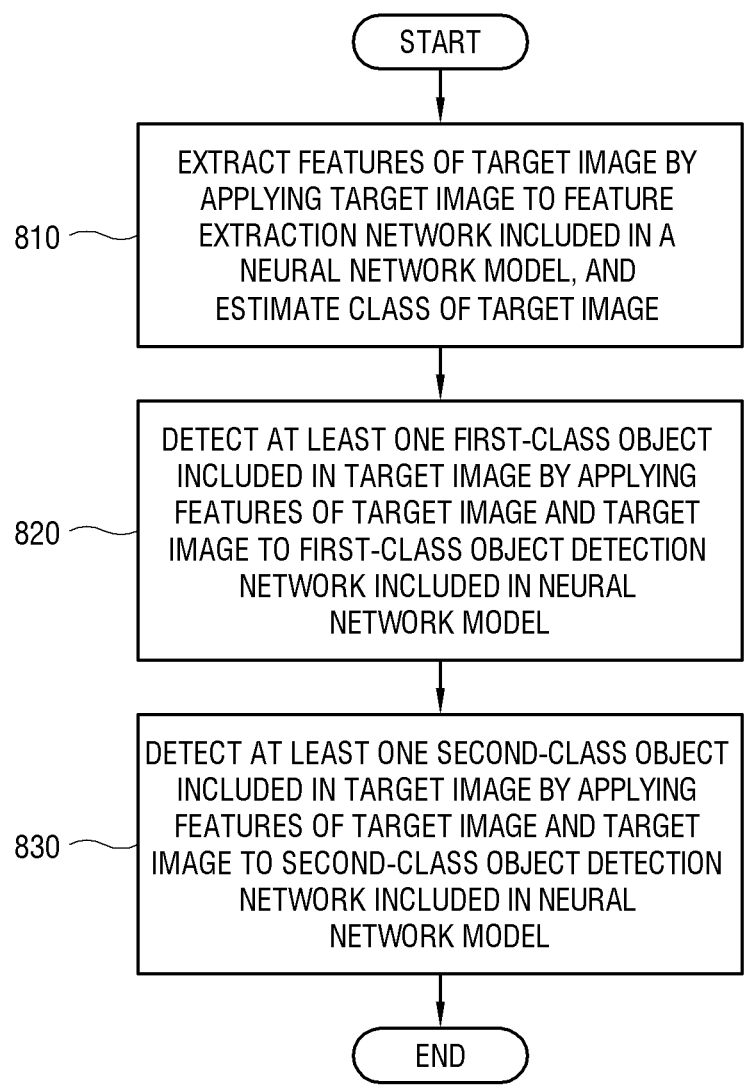
FIG. 8 shows that a neural network model according to an embodiment detects objects included in a target image.

Referring to operation 810 in FIG. 8, the electronic apparatus 10 may extract features of a target image by applying the target image to a feature extraction network included in a neural network model, and estimate a class of a target image.

Figure 9:
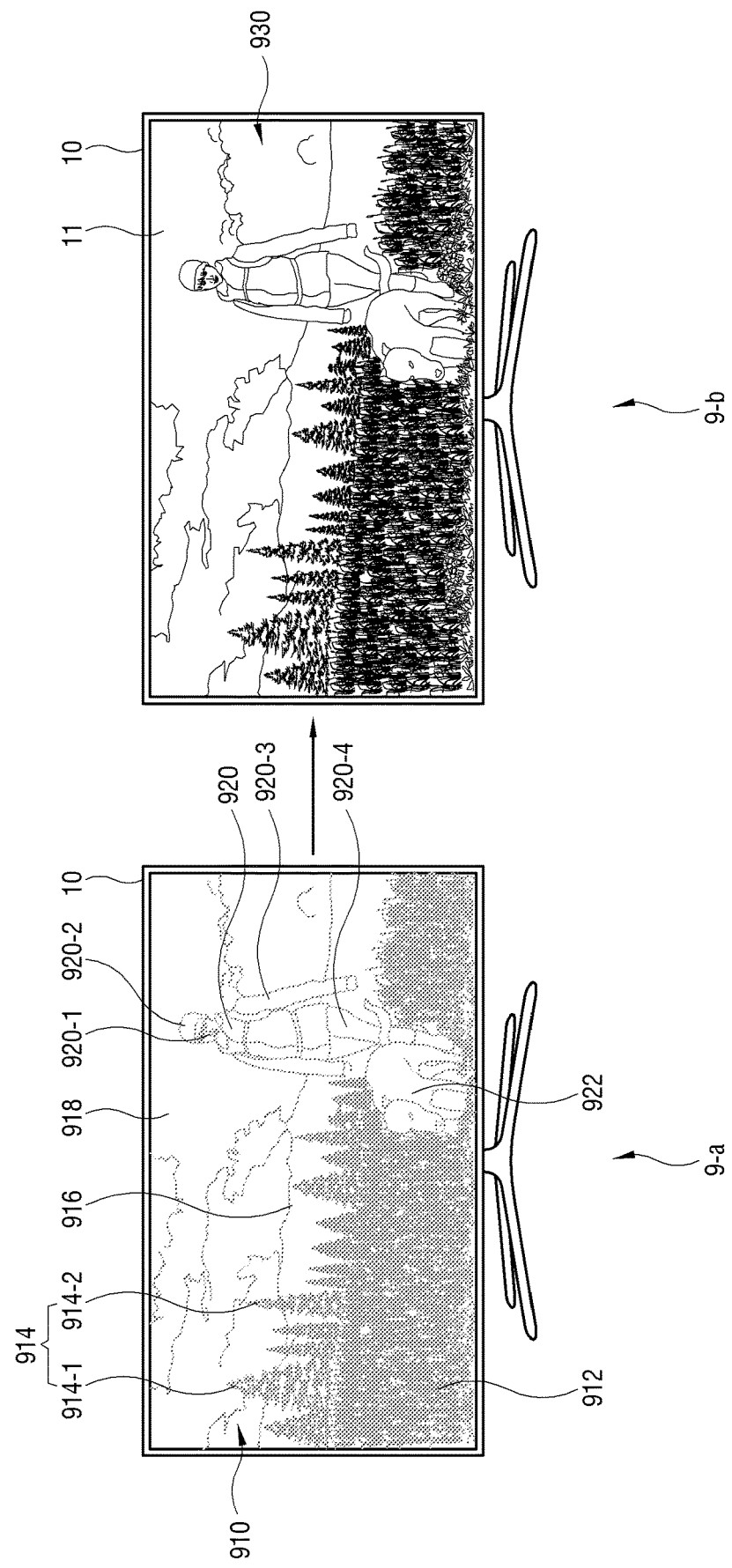
FIG. 9 shows that an electronic apparatus according to an embodiment displays a target image by performing image processing.

Referring to '9-a' in FIG. 9, the electronic apparatus 10 may extract features of a target image 910, and estimate a class of the target image 910. For example, the electronic apparatus 10 may obtain features based on at least one piece of edge information, texture information or color information about a field 912, a tree 914, a mountain 916, the sky 918, people 920, a dog 922, etc. included in the target image 910. The electronic apparatus 10 may identify that the target image 910 belongs to an image class of a scene with people based on the obtained information.

Referring to operation 820, the electronic apparatus 10 may detect at least one first-class object included in the target image by applying the features of the target image and the target image to the first-class object detection network included in the neural network model.

Referring to '9-a' in FIG. 9, the electronic apparatus 10 may detect the people 920, the dog 922, a first tree 914-1 or a second tree 914-2 as the first-class objects based on the at least one of the edge information, the texture information or the color information about the field 912, the tree 914, the mountain 916, the sky 918, the people 920, the dog 922, etc. included in the target image 910.

According to an embodiment, the electronic apparatus 10 may distinguish and detect a face 920-1, a head 920-2, an upper body 920-3, and a lower body 920-4 with respect to the people 920.

Referring to operation 830, the electronic apparatus 10 may detect at least one second-class object included in the target image by applying the features of the target image and the target image to the first-class object detection network included in the neural network model.

Referring to '9-a' in FIG. 9, the electronic apparatus 10 may detect the field 912, the mountain 916, the sky 918 as the second-class objects based on the at least one of the edge information, the texture information or the color information about the field 912, the tree 914, the mountain 916, the sky 918, the people 920, the dog 922, etc. included in the target image 910.

According to an embodiment, the electronic apparatus 10 may distinguish and detect a part 918-1 corresponding to a cloud and a part 918-2 corresponding to no clouds with respect to the sky 918.

Referring to operation 720 in FIG. 7, the electronic apparatus 10 may identify an image-quality processing method to be applied to the at least one detected object.

Referring to '9-a' in FIG. 9, the electronic apparatus 10 may detect image-quality processing methods respectively corresponding to the detected objects. For example, with regard to the face 920-1, the electronic apparatus 10 may identify the image-quality processing method of brightening the skin tone. With regard to the mountain 916, the field 912, the sky 918, etc., the electronic apparatus 10 may identify an image-quality processing method of increasing color saturation. With regard to the mountain 916 and the field 912, the electronic apparatus 10 may identify an image-quality processing method of highlighting sharpness.

Referring to the operation 730, the electronic apparatus 10 may apply the identified image-quality processing method to the detected object.

Referring to '9-b' in FIG. 9, the electronic apparatus 10 may display an image 930 with the objects, to which the image-quality processing methods are respectively applied, on the display 11.

Figure 10:
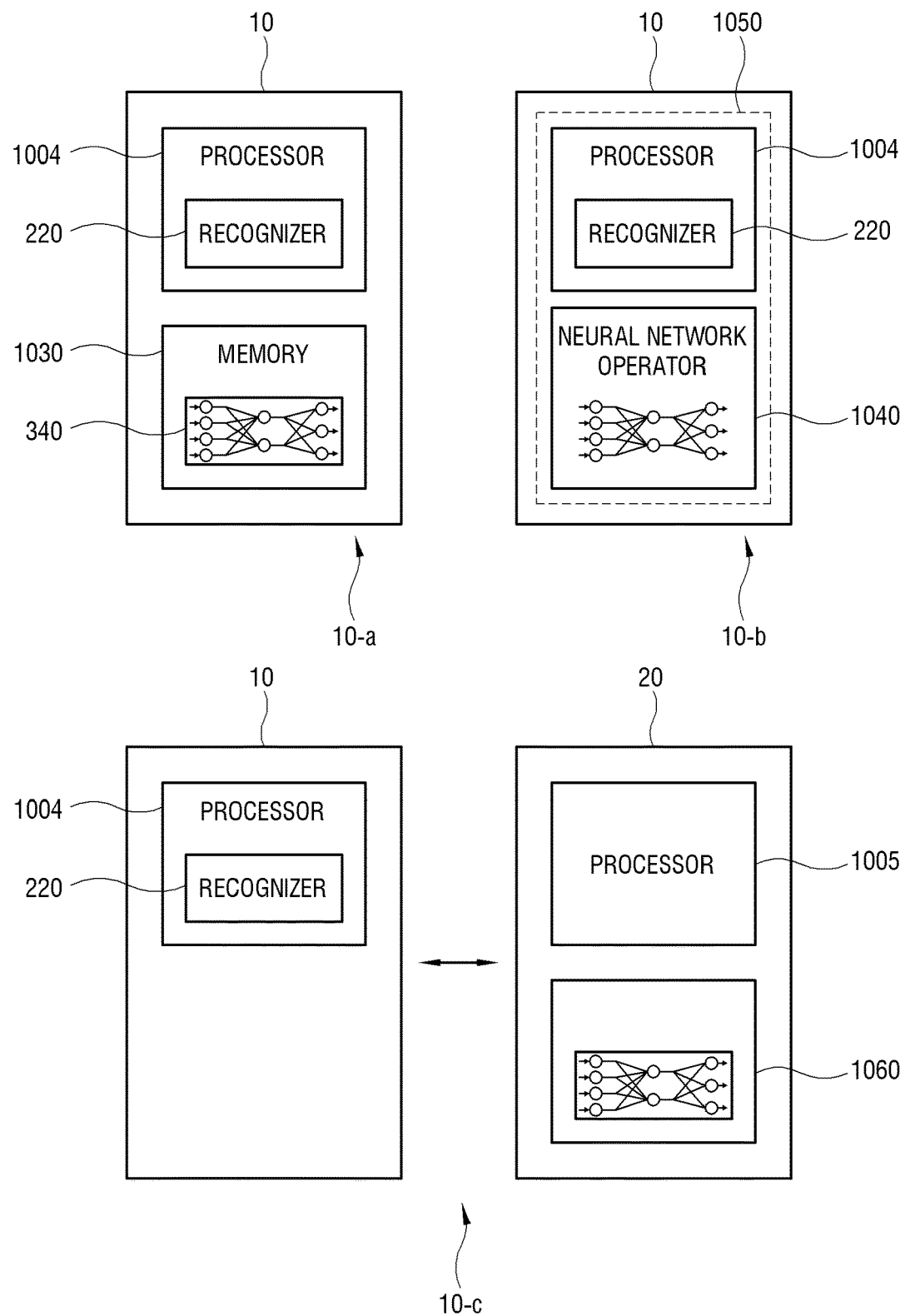
FIG. 10 shows various examples that a recognizer in an electronic apparatus according to an embodiment applies target data to a neural network model.

FIG. 10 shows various examples that a recognizer in an electronic apparatus according to an embodiment applies target data to a neural network model.

Referring to '10-a' in FIG. 10, the electronic apparatus 10 may include a processor 1004 functioning as the recognizer 220, and a memory 1030. The memory 1030 may be configured to store the neural network model 340 given in the form of software. The processor 1004 may correspond to the first processor 201 or the third processor 203 of FIG. 2. The processor 1004 may correspond to the processor 110 of FIG. 1, and the memory 1030 may correspond to the memory 120 of FIG. 1. The recognizer 220 may apply image data or video data as the target data to the neural network model 340 stored in the memory 1030, thereby obtaining recognition results.

Referring to '10-b' in FIG. 10, the neural network model 340 may be embodied in the form of hardware. For example, the electronic apparatus 10 may be mounted with an artificial intelligent chip 1050. In this case, the artificial intelligent chip 1050 may include a neural network operator 1040 for performing a neural network operation, and the processor 1004 for controlling the neural network operator 1040.

The neural network operator 1040 may have a network structure embodied by hardware to make the neural network operation faster. In this case, the neural network operator 1040 may be embodied to have some changeable attributes of the neural network model (e.g. changeable weighted values of a network).

According to an embodiment, the weighted values of the nodes of the neural network may be obtained from the outside of the artificial intelligent chip 1050, and loaded to a register (not shown) of the neural network operator 1040. For example, the weighted values loaded to the register may be weighted values related to values for a filter. The neural network operator 1040 may apply a matrix calculation (e.g. a convolution calculation, etc.) to an input value based on the weighted values loaded to the register. The input values needed for the neural network operation may include input values based on the foregoing target data, i.e. the image data. The input value may be a value obtained by converting the target data into bit data or a quantized value, and may be obtained from the outside of the artificial intelligent chip 1050 through an external interface (e.g. pins) according to clock cycles.

Referring to '10-c' in FIG. 10, the neural network model may be provided in an external apparatus (for example, a server 20). In this case, a neural network model 1060 placed in the server 20 may be stored as software in a memory (not shown) of the external apparatus 20 as indicated by '10-a' in FIG. 10, or may be embodied in the form of hardware as a part of the artificial intelligent chip 1050 of the external apparatus 20 as indicated by '10-b' in FIG. 10.

Figure 11:
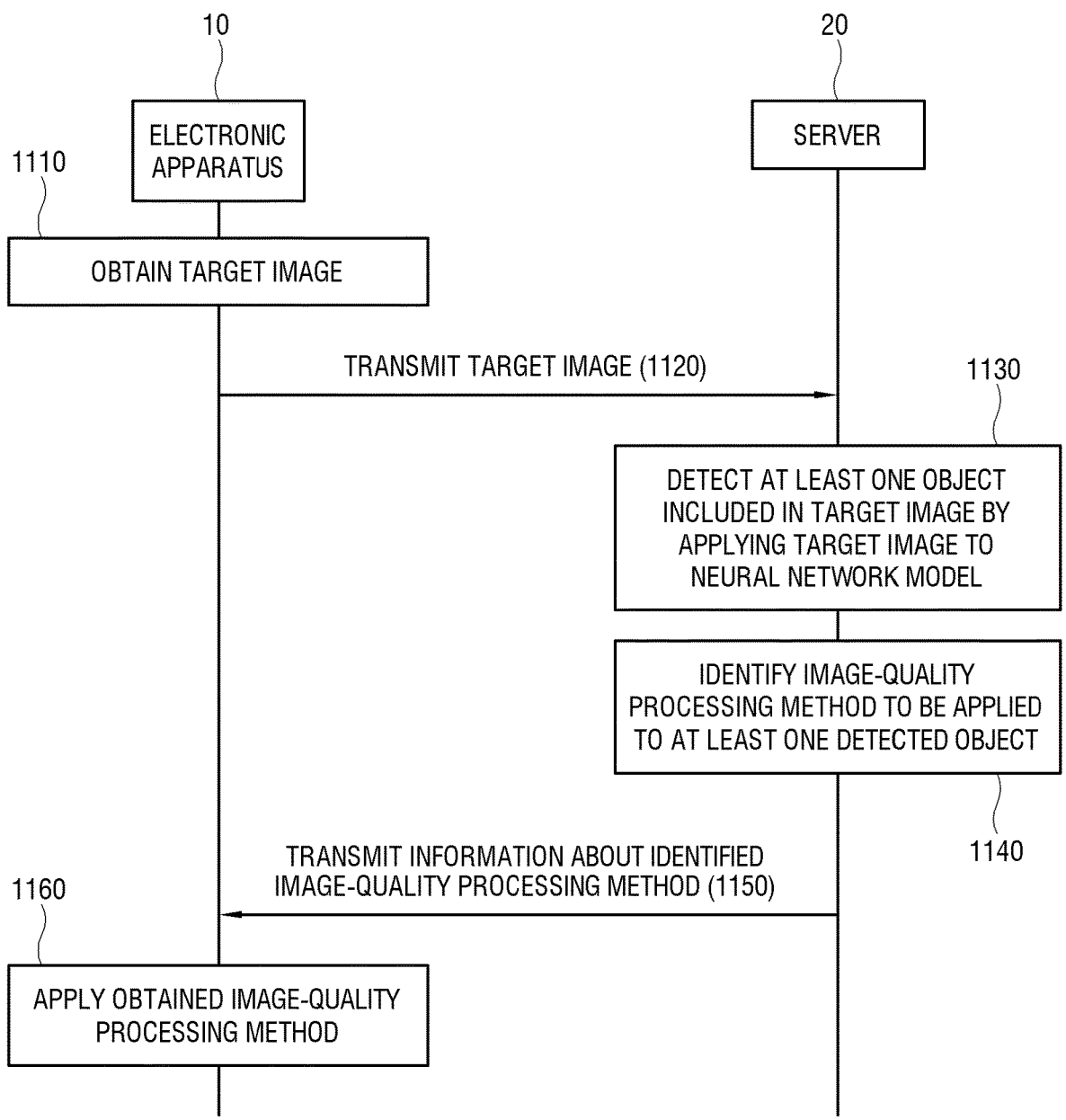
FIG. 11 shows that an electronic apparatus according to an embodiment interworks with a server to detect an object included in an image and perform image-quality processing.

FIG. 11 shows that an electronic apparatus according to an embodiment interworks with a server to detect an object included in an image and perform image-quality processing;

Referring to operation 1110, the electronic apparatus 10 may obtain a target image.

According to an embodiment, the electronic apparatus 10 may obtain an image or video from the external apparatus. Alternatively, the electronic apparatus 10 may obtain an image or video previously stored in the memory.

Referring to operation 1120, the electronic apparatus 10 may transmit the target image to the server 20.

Referring to operation 1130, the server 20 may apply the received target image to the neural network model, thereby detecting at least one object included in the target image.

According to an embodiment, the server 20 may extract the features of the target image by applying the target image to the feature extraction network included in the neural network model, and estimate the class of the target image. Further, the server 20 may apply the features of the target image and the target image to the first-class object detection network included in the neural network model, thereby detecting at least one first-class object included in the target image. Further, the server 20 may apply the features of the target image and the target image to the second-class object detection network included in the neural network model, thereby detecting at least one second-class object included in the target image.

Referring to operation 1140, the server 20 may identify an image-quality processing method to be applied to at least one detected object.

Referring to operation 1150, the server 20 may transmit information about the identified image-quality processing method to the electronic apparatus 10. In this case, the server 20 may additionally transmit information about the detected objects (e.g. the kinds, numbers, positions, etc. of detected objects).

Referring to operation 1160, the electronic apparatus 10 may display the target image subjected to the obtained image-quality processing method.

Figure 12:
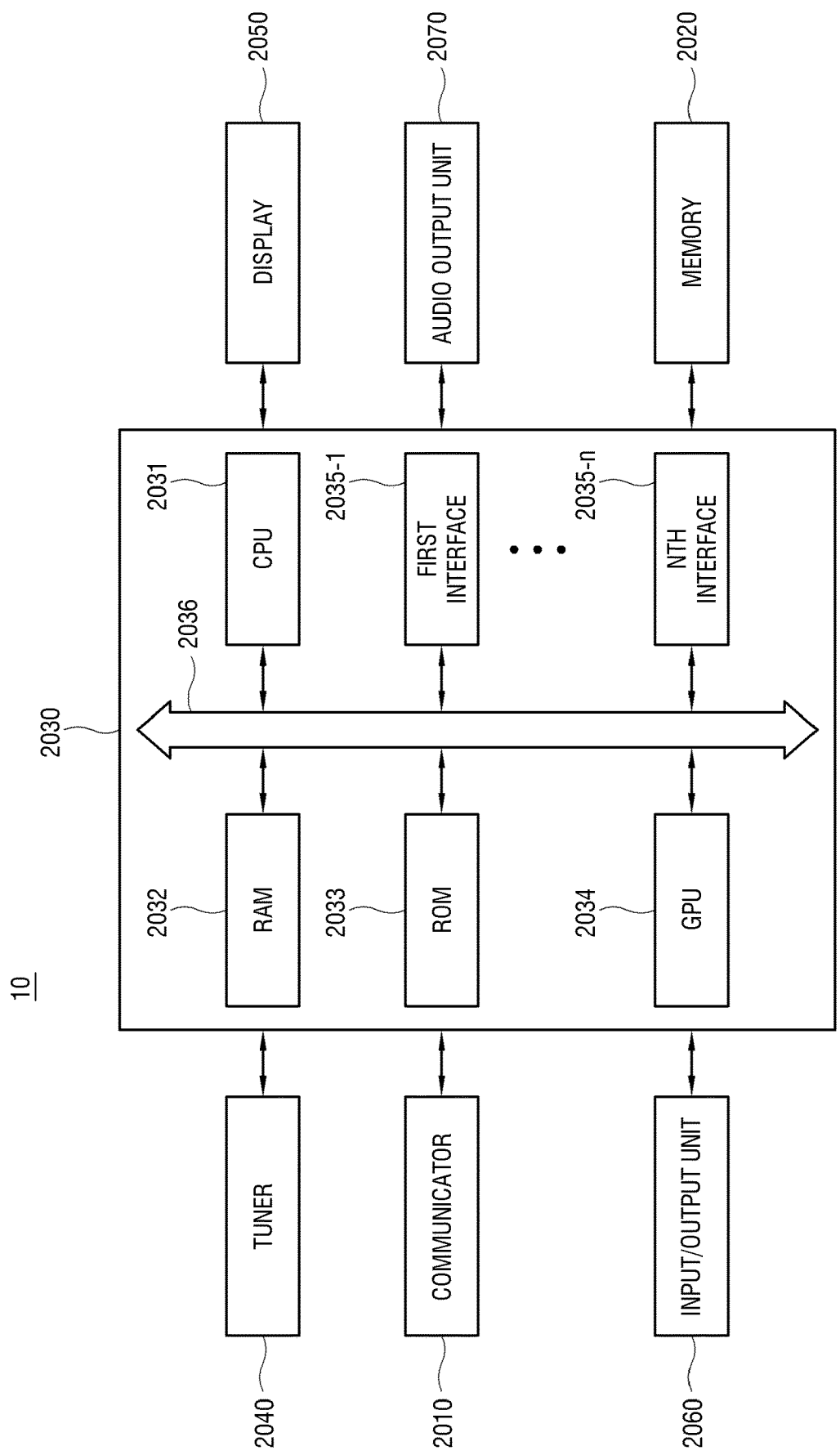
FIG. 12 is a block diagram of an electronic apparatus according to another embodiment of the disclosure.

FIG. 12 is a block diagram of an electronic apparatus 10 according to another embodiment of the disclosure.

Referring to FIG. 12, the electronic apparatus 10 may include a communicator 2010, a memory 2120, a processor 2030, a tuner 2040, a display 2050, an input/output unit 2060, and an audio output unit 2070. Some elements among these elements may be omitted according to embodiments, and proper hardware/software elements obvious to those skilled in the art may be added to the electronic apparatus 10 even though they are not shown.

The communicator 2010 is configured to communicate with an external apparatus. Descriptions of the communicator 2010 illustrated in FIG. 12 may be substituted by those of the communicator 130 described with reference to FIG. 1.

The memory 2020 may be configured to store an operating system (O/S) and various pieces of data for driving and controlling the electronic apparatus 10. Descriptions of the memory 2020 illustrated in FIG. 12 may be substituted by those of the memory 120 described with reference to FIG. 1.

The tuner 2040 may be configured to be tuned to only a frequency of a desired channel selected by the electronic apparatus 10 among many radio waves based on amplification, mixing, resonance, etc. with respect to a broadcast signal received by a wire or wirelessly.

The tuner 2040 may receive a broadcast signal including video, audio and appended data within a frequency band corresponding to a channel selected by a user.

The tuner 2040 may receive a broadcast signal from various sources such as terrestrial broadcasting, cable broadcasting, satellite broadcasting, etc. The tuner 2040 may receive a broadcast signal from analog broadcasting, digital broadcasting, or the like source.

The broadcast signal received in the tuner 2040 may include video data, audio data, and metadata, i.e. information about a program. The metadata may include appended data about a broadcast program, e.g. a program title, a synopsis, a broadcast start time, a broadcast end time, etc. The information about the broadcast program, i.e. the metadata may be received through not only the tuner 2040 but also the communicator 2010 from an Internet server.

The tuner 2040 may be integrated into the all-in-one electronic apparatus 10, or may be a separate device electrically connected to the electronic apparatus 10 (e.g. a tuner connected to an input/output unit 2060 or the communicator 2010).

The display 2050 may be configured to display an image, for example, output the video data included in the broadcast signal received through the tuner 2040, an image received through the communicator 2010 or the input/output unit 2060, or an image included in an image file stored in the memory 2020.

The display 2050 may for example be embodied by a liquid crystal display (LCD), and may also be embodied by a cathode ray tube (CRT), a plasma display panel (PDP), organic light emitting diode (OLED), a transparent OLED (TOLED), etc. as necessary. Further, the display 2050 may be embodied in the form of a touch screen capable of detecting a user's touch control.

The audio output unit 2070 may be configured to output a sound, and may for example may make an audio output included in a broadcast signal received through the tuner 2040, an audio output received through the communicator 2010 or an input/output unit 2060, or an audio output included in an audio file stored in the memory 2020. The audio output unit 2070 may include a loudspeaker and/or a headphone output terminal.

The input/output unit 2060 may be configured to connect with an external apparatus, and may for example include a high definition multimedia interface (HDMI) port, a component input jack, a universal serial bus (USB) port, etc. Besides, the input/output unit 2060 may include at least one of RGB, DVI, DP, Thunderbolt, or the like port.

The processor 2030 may control general operations of the electronic apparatus 10. Descriptions of the processor 2030 illustrated in FIG. 12 may be substituted by those of the processor 110 described with reference to FIG. 1.

The processor 2030 may include a random access memory (RAM) 2032, a read only memory (ROM) 2033, a graphic processing unit (GPU) 2034, a central processing unit (CPU) 2031, first to nth interfaces 2035-1~2035-n, and a bus 2036. In this case, the RAM 2032, the ROM 2033, the GPU 2034, the CPU 2031, the first to nth interfaces 2035-1~2035-n, etc. may be connected to one another through the bus 2036.

The ROM 2033 is configured to store an instruction set or the like for system booting. When the electronic apparatus 10 receives a turning-on instruction and is supplied with power, the CPU 2031 copies at least a part of the O/S stored in the memory 2010 in response to the instruction stored in the ROM 2033, and executes the O/S, thereby booting up the system. The CPU 2031 copies various programs stored in the memory 2020 to the RAM 2032, and executes the programs copied to the RAM 2032, thereby carrying out various operations. The CPU 2031 may carry out various operations based on various program modules, data, etc. stored in the memory 2020.

The GPU 2034 may display an image when the electronic apparatus 10 is completely booted up. The GPU 2034 may use an operator and a renderer to generate a screen including various objects such as an icon, an image, a text, etc. The operator operates attributes values such as coordinate values, shapes, sizes, colors, etc. of objects according to the layouts of the screen. The renderer generates a screen with objects according to various layouts based on the attribute values operated in the operator. The screen generated in the renderer is provided to the display 2050 and displayed in a display area.

The first to nth interfaces 2035-1 to 2035-n may connect with various elements 2010, 2020, 2040 and 2070 as described above. One of the interfaces may include a network interface connecting with an external apparatus through a network.

Various embodiments described above may be implemented by software, hardware or combination thereof. When the embodiments are implemented by the hardware, the embodiments described in the disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electric units for carrying the functions. When the embodiments are implemented by software, the procedures and functions in the embodiments of the disclosure may be achieved by separate software modules. Each of the software modules may carry out one or more functions and operations described in the disclosure.

Various embodiments of the disclosure may be implemented by software including an instruction that can be stored in a machine (e.g. computer)-readable storage medium. The machine refers to an apparatus that can call the stored instruction from the storage medium and operate based on the called instruction, and may include the electronic apparatus 10 according to the embodiments of the disclosure. When the instruction is executed by the processor, the function corresponding to the instruction may be carried out by the processor directly or by other elements under control of the processor. The instruction may include a code generated or executed by a complier or interpreter. The machine-readable storage medium may be provided in the form of a non-transitory storage medium. Here, the term 'non-transitory' just means that the storage medium is tangible without including a signal, and does not mean that data is semipermanently or temporarily stored in the storage medium.

According to an embodiment, the method according to various embodiments of the disclosure may be provided as involved in a computer program product. The computer program product may be traded as goods between a seller and a buyer. The computer program product may be online distributed from the server to the electronic apparatus through an application store (e.g. a Play Store™), as involved in the machine-readable storage medium (e.g. a compact disc read only memory (CD-ROM)). In a case of the online distribution, at least a part of the computer program product may be at least temporarily stored in the machine-readable storage medium such as a memory of a relay server, a server of the application store, or a server of a manufacturer, or may be provisionally generated.

According to various embodiments, the elements of the foregoing elements (e.g. a module or a program) may include a single or a plurality of objects, and some sub elements may be removed from the foregoing corresponding sub elements, or other subs elements may be added to various embodiments. Alternatively or additionally, the plurality of elements (e.g. modules or programs) may be integrated into one element, and perform the same or similar functions as those performed by individual corresponding elements of before the integration. According to various embodiments, operations performed by the module, the program or other elements may be carried out in sequence, in parallel, repetitively, or heuristically, or at least some operations may be executed in different order, be omitted or include other operations.

According to an aspect of the disclosure, the electronic apparatus may distinguish and detect a first-class object and a second-class object included in an image.

According to an aspect of the disclosure, the electronic apparatus may distinguish and detect the first-class object and the second-class object based on the detected class of the image.

According to an aspect of the disclosure, the electronic apparatus may train a certain neural network model to obtain information about the first-class object and information about the second-class object, thereby increasing the speed of the electronic apparatus and saving the storage space.

Although a few embodiments of the disclosure have been illustrated and described, the disclosure is not limited to these embodiments, and various modifications can be made by a person having an ordinary knowledge in the art without departing from the scope of the disclosure and should be construed within the technical concept or prospect of the disclosure.

What is claimed is:

1. An electronic apparatus comprising:
a memory configured to store instructions; and
at least one processor connected to the memory, and configured to perform processing to:
apply a target image to a trained neural network model to detect a first-class object and a second-class object included in the target image, wherein the trained neural network model comprises a feature-extraction neural network comprising a plurality of layers, to estimate a class to which an image belongs, and the plurality of layers comprises:
a first plurality of layers to obtain at least one of texture information, color information or edge information of the target image, and
a second plurality of layers to obtain at least one of color information or edge information about a shape of at least a partial area of an object included in the target image,
identify different image-quality processing methods to be applied to the detected first-class object and the detected second-class object, respectively, and
individually apply the identified different image-quality processing methods to the detected first-class object and the detected second-class object, respectively.

2. The electronic apparatus according to claim 1, wherein the neural network model is trained to detect the first-class object and the second-class object included in the target image, based on learning data including a learning image, a class to which the learning image belongs, information about a first-class object included in the learning image, and information about a second-class object included in the learning image.

3. The electronic apparatus according to claim 2, wherein
the information about the first-class object comprises at least one of information about pixels corresponding to an object, information about a bounding box surrounding the object, and information about a texture of the object, and
the information about the second-class object comprises at least one of information about pixels corresponding to an object, and information about a texture of the object.

4. The electronic apparatus according to claim 2, wherein the trained neural network model comprises a first-class object detection neural network to detect the first-class object, and a second-class object detection neural network to detect the second-class object.

5. The electronic apparatus according to claim 4, wherein the plurality of layers comprise a plurality of filters.

6. The electronic apparatus according to claim 5, wherein the at least one processor is configured to perform processing to extract features of the target image through at least some filters among the plurality of filters, and decrease result values through at least some other filters among the plurality of filters.

7. The electronic apparatus according to claim 6, wherein the at least one processor is configured to perform processing to detect the first-class object included in the target image by applying the features of the target image obtained through the feature-extraction neural network to the first-class object detection neural network.

8. The electronic apparatus according to claim 6, wherein the at least one processor is configured to perform processing to control the first-class object detection neural network to merge a result of detecting the first-class object based on at least one of the texture information, the color information, or the edge information of the target image, and a result of detecting the first-class object based on at least one of the color information or the edge information about a shape of at least some areas of an object included in the target image, and identify the first-class object having a high confidence level.

9. The electronic apparatus according to claim 6, wherein the at least one processor is configured to perform processing to control the second-class object detection neural network to detect the second-class object by increasing result values, which are obtained from applying the plurality of filters to the features of the target image obtained in each layer of the feature-extraction neural network, into a preset size and then merging the result values.

10. A method comprising:
performing, by at least one processor, processing to
apply a target image to a trained neural network model to detect a first-class object and a second-class object included in the target image, wherein the trained neural network model comprises a feature-extraction neural network comprising a plurality of layers, to estimate a class to which an image belongs, and the plurality of layers comprises:
a first plurality of layers to obtain at least one of texture information, color information or edge information of the target image, and
a second plurality of layers to obtain at least one of color information or edge information about a shape of at least a partial area of an object included in the target image;

identify different image-quality processing methods to be applied to the detected first-class object and the detected second-class object, respectively; and individually apply the identified different image-quality processing methods to the detected first-class object and the detected second-class object, respectively.

11. The method according to claim 10, wherein the trained neural network model comprises a first-class object detection neural network to detect the first-class object, and a second-class object detection neural network to detect the second-class object.

12. The method according to claim 11, wherein the plurality of layers comprises a plurality of filters.

13. The method according to claim 12, further comprising:

extracting features of the target image through at least some filters among the plurality of filters, and decreasing result values through at least some other filters among the plurality of filters.

14. The method according to claim 13, further comprising:

detecting the first-class object included in the target image by applying the features of the target image obtained through the feature-extraction neural network to the first-class object detection neural network.

15. The method according to claim 14, further comprising:

controlling the first-class object detection neural network to merge a result of detecting the first-class object based on at least one of the texture information, the color information, or the edge information of the target image, and a result of detecting the first-class object based on at least one of the color information or the edge information about a shape of at least some areas of an object included in the target image, and identifying the first-class object having a high confidence level.

16. The method according to claim 13, further comprising:

controlling the second-class object detection neural network to detect the second-class object by increasing result values, which are obtained from applying the plurality of filters to the features of the target image obtained in each layer of the feature-extraction neural network, into a preset size and then merging the result values.

17. A computer-readable recording medium storing instructions that are executable by at least one processor to:

apply a target image to a trained neural network model to detect a first-class object and a second-class object included in the target image, wherein the trained neural network model comprises a feature-extraction neural network comprising a plurality of layers, to estimate a class to which an image belongs, and the plurality of layers comprises:

a first plurality of layers to obtain at least one of texture information, color information or edge information of the target image, and a second plurality of layers to obtain at least one of color information or edge information about a shape of at least a partial area of an object included in the target image;

identify different image-quality processing methods to be applied to the detected first-class object and the detected second-class object, respectively; and individually apply the identified different image-quality processing methods to the detected first-class object and the detected second-class object, respectively.

* * * * *